Patented Sept. 4, 1934

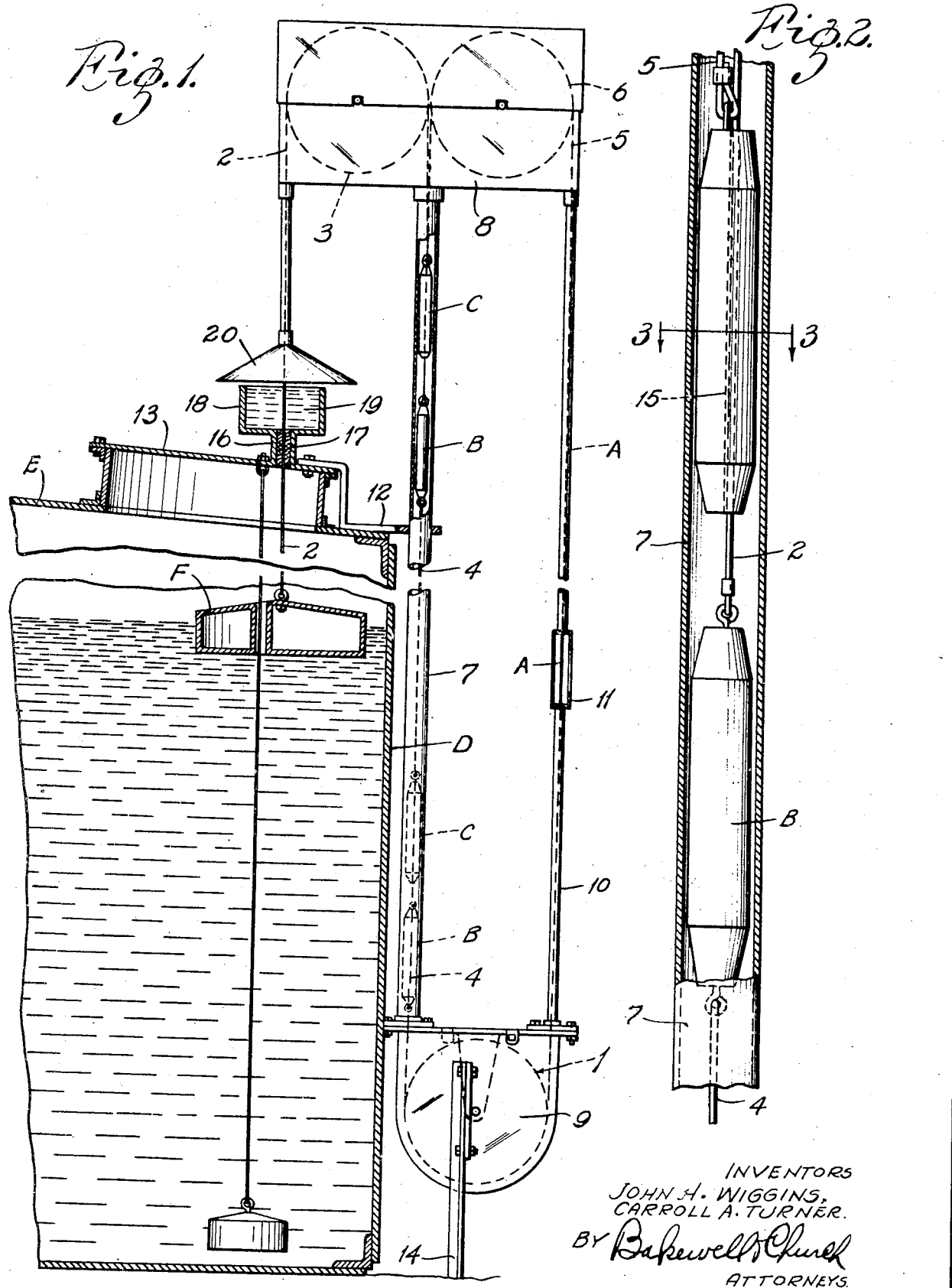

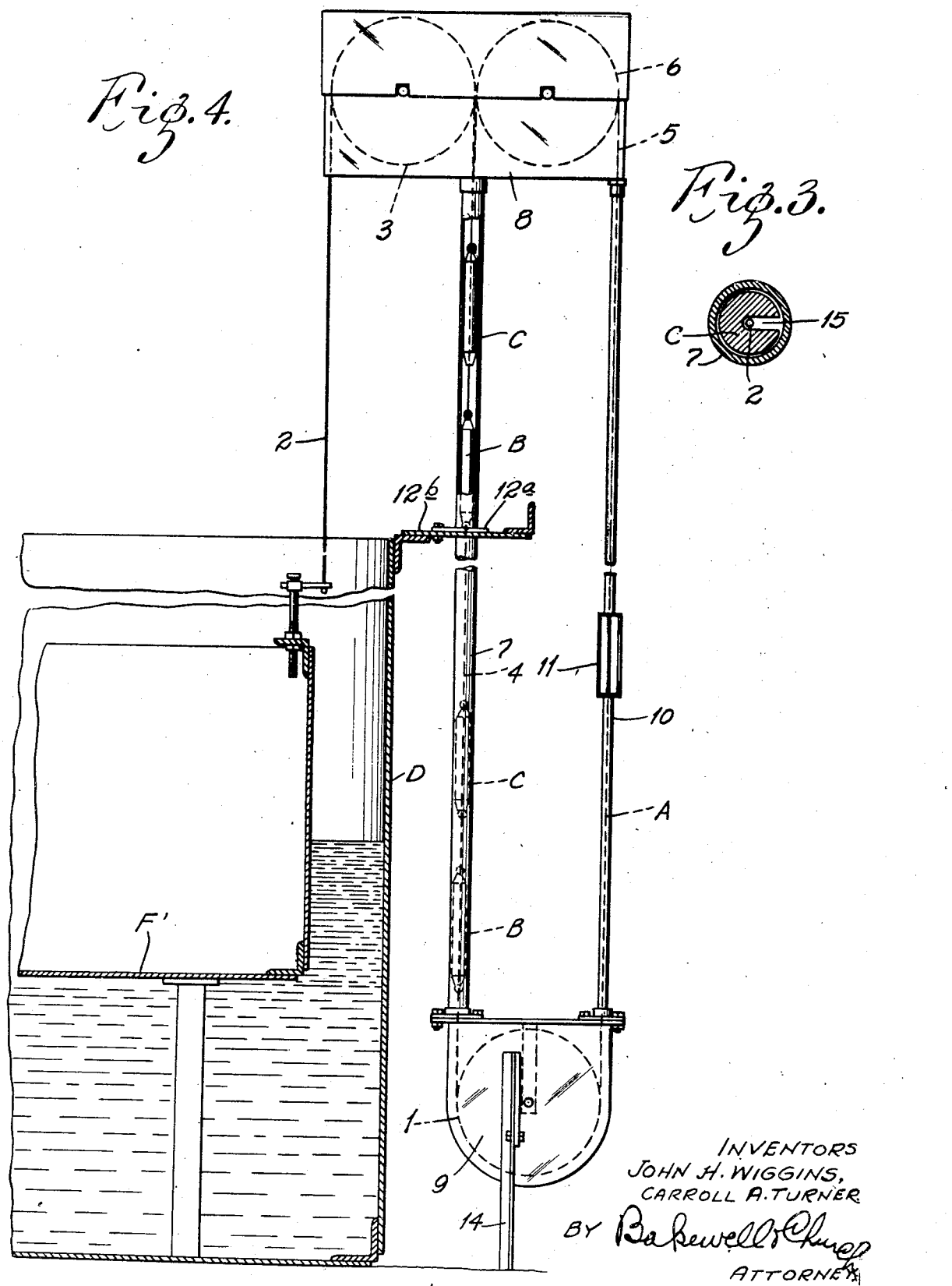

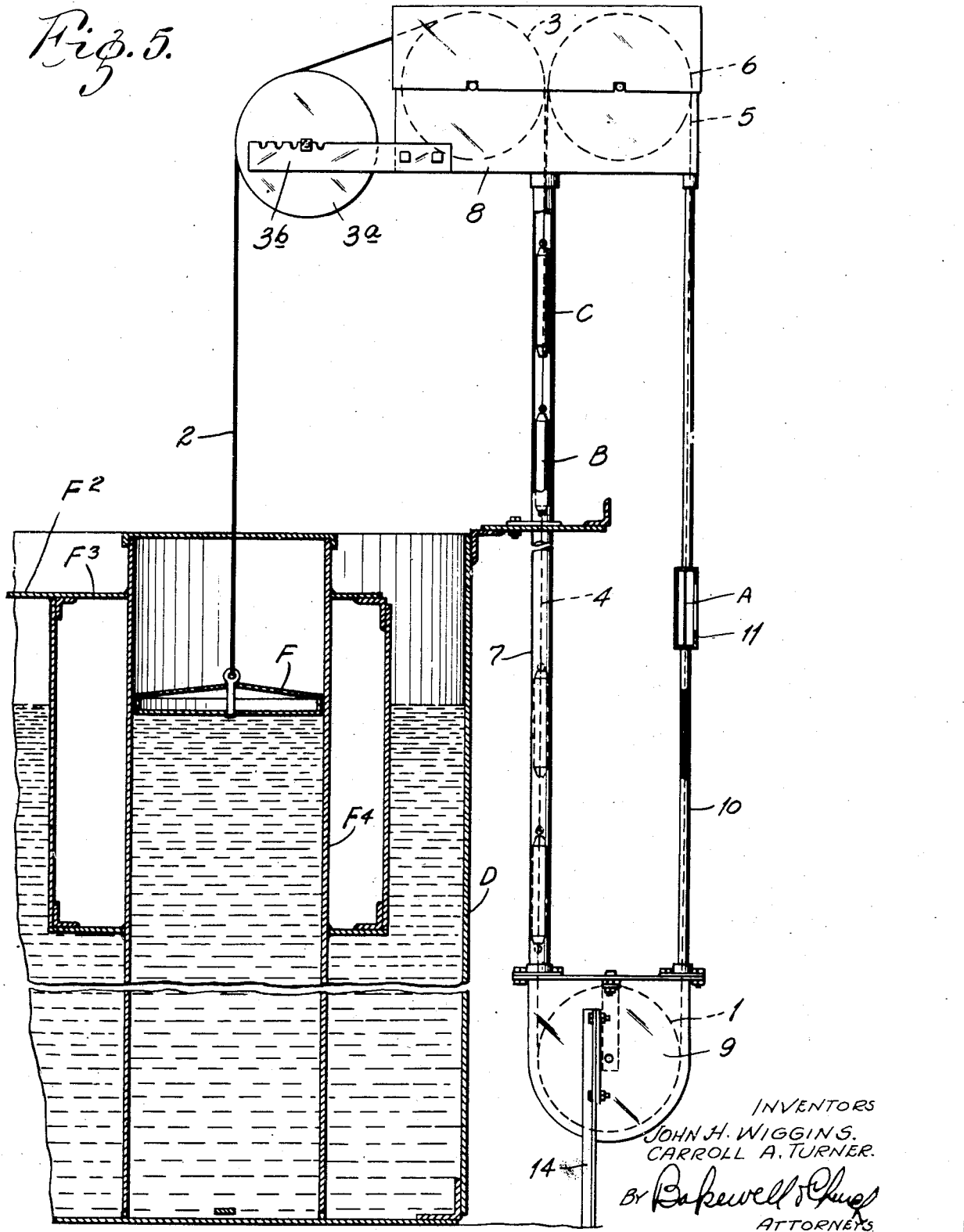

1,972,120

UNITED STATES PATENT OFFICE 1,972,120

AUTOMATIC GAUGE FOR LIQUID STORAGE TANKS

John H. Wiggins and Carroll A. Turner, Tulsa, Okla., assignors to John H. Wiggins Company, Chicago, Ill., a corporation of Delaware Application June 8, 1931, Serial No. 543,772

10 Claims. (Cl. 73—82)

This invention relates to automatic tank gauges, and particularly automatic gauges of the type that comprise a marked element or tape which forms part of a flexible member that travels around sheaves or pulleys and which is attached to a float in the tank in such a way that the tape will move with the float, and thus produce a visual indicator which a person can read to ascertain the depth or approximate quantity of the liquid in the tank.

The main object of our invention is to provide an automatic gauge that is particularly adapted for use with the various types and kinds of large storage tanks used in the oil industry, and which has the following desirable features or characteristics that make it a decided improvement upon conventional automatic tank gauges:

1st. It is composed of a minimum number of parts that are so constructed and arranged that friction is reduced to a minimum;

2nd. It can be installed quickly, easily and without the necessity of forming holes or welded joints in the roof, cover or top of the tank;

3rd. It can be read by a person standing on the ground at one side of the tank;

4th. It is accurate and not liable to get out of order when in use; and

5th. It will retain its accuracy even after it has been in use for a long period.

Figure 1 illustrates an automatic gauge embodying our invention, installed on a liquid storage tank of the type that is equipped with a fixed or stationary roof joined by a gas and liquid-tight joint to the side wall of the tank.

Figure 2 is an enlarged longitudinal sectional view of the tubular member which guides and houses the actuating weight or weights that are attached to or combined with the flexible member of the gauge.

Figure 3 is a transverse sectional view, taken on the line 3—3 of Figure 2.

Figure 4 illustrates our improved gauge installed on a liquid storage tank equipped with a floating roof of the so-called pan type, i. e., a roof whose underside contacts with the liquid in the tank on which the roof floats; and Figure 5 illustrates our improved gauge installed on a tank equipped with a floating roof of the combined breather and floater type, i. e., a floating roof which is of such construction that it floats on the liquid in the tank in such a way that gases can collect in the space between the underside of the roof and the surface of the liquid in the tank.

Briefly described, our improved tank gauge consists of a relatively long, flexible member, attached at one end to a float or equivalent means and arranged so as to form a closed loop, said flexible member being mounted on pulleys and comprising a tape or equivalent element that contains indicia which represent units of measurement, and means for imposing a weight or load on said flexible element so as to hold it taut or substantially so, and cause the tape or marked element combined with said flexible member to travel in opposite directions past a stationary pointer, reading box or indicator, when the float in the tank moves in opposite directions.

In the form of our invention herein illustrated, a plurality of weights are used to actuate the flexible member of the gauge and cause said flexible member to move with the float, and said weights are arranged so that approximately one-half of the load, weight or force relied upon to actuate the flexible member is located at one end of the actuating train and the remainder of said load, weight or force is located at an intermediate point in the actuating train. The purpose of using two weights instead of a single weight, is to reduce the friction on the sheave bearings and on the co-acting surfaces of the sheaves and the flexible member that travels over same. To further reduce the friction, we use sheaves or pulleys of relatively large diameter for supporting and changing the direction of movement of the flexible member of which the tape forms a part, and we arrange one of said sheaves or pulleys in such a way that it tends to be counterbalanced by that part of the actuating load or weight which is attached to the terminal end of said flexible member, and thus practically eliminates friction on the axle of said pulley.

While we prefer to use a plurality of weights to actuate the flexible member, as previously explained, it is not absolutely essential that a plurality of weights be employed, for if desired, a single weight may be attached to the terminal end of the flexible member. In fact, the gauge can be constructed in various ways and can be installed on the tank in various ways without departing from the spirit of our invention. It is of such design that when installed, it is located wholly on the exterior of the tank, and it is of such construction that it can be installed quickly, easily and without the necessity of forming holes or welded joints on the roof of the tank. One novel feature of our gauge which simplifies the construction and installation of the gauge, is the use of a single tube or similar member for housing a plurality of sections or portions of the flexible member that leads from the interior of the tank. Thus, as hereinafter explained, the flexible member is arranged so as to form four strands or sections, two of which are housed in a single tube and travel in the same direction through said tube. In order to permit of the use of a housing or tube of small diameter for the two strands previously referred to the weight attached to the terminal section of the flexible member is constructed in such a way that it receives, straddles or embraces the other section of the flexible member that is arranged inside of said tube or housing. So far as this feature of our invention is concerned, it is immaterial whether a single weight or a plurality of weights are used to actuate the flexible member.

In the preferred form of our invention herein illustrated the gauge comprises a reading element or tape A arranged to travel around a rotatable sheave 1 and provided with indicia that represent units of measurement, a weight B suspended from one end of a cable or equivalent flexible device 2 that passes over a supporting sheave 3 and which is attached to a float or similar part in the tank that rises and falls as the level of the liquid in the tank varies, a cable or equivalent flexible device 4 attached to the weight B and to one end of the tape A so as to cause said tape to move with the weight B, and a second weight C attached to the opposite end of the tape A by a cable or equivalent flexible device 5 that travels over a supporting sheave or pulley 6. The tape A and the cables to which it is attached form a relatively long, flexible member of substantially loop form, made up of a plurality of sections or strands, that leads from the float in the tank to a point on the exterior of the tank, where a person can easily ascertain the depth or quantity of the liquid in the tank by reading the tape, said flexible member being supported and guided by the sheaves over which it travels, and the weights B and C causing said flexible member to move in one direction when the level of the liquid in the tank rises, and to move in the opposite direction when the level of said liquid drops.

In Figure 1 of the drawings D designates the tank on which the gauge is installed, and E designates the roof or top of the tank, which roof may be rigid or of such construction that it will "breathe", i. e., flex upwardly and downwardly when liquid is being admitted to or withdrawn from the tank, or when a change in atmospheric conditions causes the liquid in the tank to expand or contract. On the outside of the tank is a vertically-disposed, tubular member 7 that guides and houses the weights B and C and also serves as a support for a housing 8 inside of which the sheaves 3 and 6 are rotatably mounted, said tubular member 7 being arranged in parallel relation to the side wall of the tank. The cable or flexible member 2, from one end of which the weight B is suspended, leads upwardly from said weight over the sheave 3, and thence downwardly to a float F that floats upon or is supported by the liquid in the tank D. When the level of the liquid in the tank rises, the weight B will descend the same distance the liquid level rises, and when the level of the liquid in the tank drops, the weight B will move upwardly the same distance that the liquid lever drops. At the same time, i. e., simultaneously with the movement of the weight B, the weight C will move the same distance as the weight B and in the same direction and at the same speed as said weight B, thereby causing the tape A to accurately indicate the level of the liquid in the tank.

The guide sheave or pulley 1 around which the tape A travels is mounted in a housing 9 arranged adjacent the ground on which the tank D is erected, which housing 9 is attached to the lower end of the tubular member 7 that houses and guides the weights B and C. A second tubular housing member 10 is arranged parallel to the housing member 7 and is attached at its upper and lower ends to the top and bottom sheave housings 8 and 9, respectively, said housing members 7 and 10 cooperating with the sheave housings to guide and protect the flexible member of which the tape A forms a part. The part of the housing means in which the tape A travels can be constructed in any preferred or suitable way that will permit the tape to be easily read by a person who desires to ascertain the depth or approximate quantity of liquid in the tank. Preferably, the housing member 10 is provided with a reading box 11 having a sight opening or a shiftable closure that can be opened so as to expose to view a portion of the tape A, and thus enable the observer to ascertain from the numerals, graduations or other indicia on the tape the depth or approximate quantity of the liquid in the tank, the flexible member of which the tape A forms a part being so constructed and arranged that when the tank D is empty, the weights B and C will occupy the position shown in full lines in Figure 1, and thus maintain the tape A in such a position that the graduation, numeral or indicia thereon that designates an empty tank will be disposed in alignment with the reading box 11. When the tank D is full, the weights B and C will occupy the position shown in broken lines in Figure 1, and the tape A will be maintained in such a position that the graduation, numeral or indicia thereon which designates a full tank, will be disposed in alignment with the reading box 11. Preferably, the reading box 11 is arranged close enough to the ground to enable the tape A to be read by a person standing on the ground at one side of the tank.

The guiding and housing structure above referred to is arranged on the exterior of the tank D, and is sustained by a supporting member 12 that projects laterally from the top edge of the side wall of the tank. In order that said guiding and housing structure may be installed quickly, easily and without the necessity of forming holes or welded joints on the roof E of the tank, the supporting member 12 is attached to a removable manhole cover 13 carried by the tank roof, and a stake or other suitable guy 14 is driven into the ground and attached to the bottom sheave housing 9 so as to prevent the guiding and housing structure from swaying. Usually, the tubular members 7 and 10 of the guiding and housing structure will be formed from metal pipe, and the top sheave housing 8 will be divided horizontally so as to enable the top sheaves to be easily installed in or removed from their housing. The manhole cover 13 to which the supporting member 12 is attached, can be removed easily from the roof of the tank and drilled to receive the fastening devices used to attach the supporting member 12 to said cover, thereby overcoming the necessity of forming holes in the roof of the tank for fastening devices used to install the gauge.

As previously stated, both of the weights B C are reciprocatingly mounted in the tubular member 7. The terminal weight C which is attached to the free end or terminal end of the cable 5, is provided with a longitudinally-disposed slot 15, open at one side, as shown in Figure 3, for receiving the cable 2 from which the intermediate weight B is suspended, thereby overcoming the necessity of using two separate and distinct guides and housings for the two weights B and C, and making the gauge compact, inexpensive and easy to install. Another advantage that results from arranging both weights in the same guide and housing is that the entire apparatus will be centered on a single member which projects upwardly from the side wall of the tank. It is, of course, not absolutely essential that both of the weights B and C be arranged in the same housing or guiding member, but this is desirable for the reasons above mentioned. Nor is it essential that two weights be employed to actuate the flexible member, for if desired, a single weight could be attached to the terminal section or portion of the flexible member. If a tube of relatively small diameter is used to form the housing member 7, the weight attached to the terminal section of the flexible member will be provided with a slot for receiving the strand of the flexible member that leads downwardly from the sheave 3.

The cable 2 which joins the float F to the weight B is preferably led out of the tank through a means which forms practically a frictionless passageway for said cable that is substantially gas-tight. As shown in Figure 1, the cable 2 which is about 1/8" in diameter and practically smooth, comprises a vertically-disposed portion that passes upwardly through a tubular guide 16 on the manhole cover 13 that is equipped with a non-metallic packing 17, preferably a felt washer, that surrounds said vertically-disposed portion and snugly engages the same. Attached to the guide 16 is a reservoir 18 that holds a viscous liquid 19 which effectively seals the hole in the packing 17 through which the vertically-disposed portion of the cable 2 passes, the reservoir 18 being relatively wide and low, so that a high head of liquid is not necessary, in order to get a large volume. As the vertically-disposed portion of the cable 2 moves downwardly, due to a drop in the level of the liquid in the tank, some of the liquid 19 in the reservoir 18 will be pulled through the hole in the packing 17, but this will be of minute volume as compared to the total volume of the reservoir. Consequently, a single charge of liquid 19 in the reservoir 18 will last for a long time to maintain a gas-tight joint between the cable 2 and the guide on the roof of the tank through which said cable passes. Such a sealing means is inexpensive to build and install, it is easy to maintain in an operative condition, and it is highly efficient, as it is of such design that it exerts practically no friction on the cable 2. As shown in Figure 1, the open upper end of the reservoir 18 is protected by a combined rain shield and sun shade 20.

Friction in our improved gauge is reduced by using large sheaves for the flexible member of which the tape A forms a part, and by dividing the actuating load, weight or force for said flexible member into two halves, that are arranged at different points in the actuating train, as previously explained. In the gauge shown in Figure 1, the load on the axle of the sheave 6 equals double weight C. The load on the axle of the sheave 3 equals double weight C, plus double weight B. If all the actuating weight had been concentrated in C, so that the weight of C would have equalled C, plus B, as herein shown, then the weight on the axle of the sheave 6 would have been double what it now is. Therefore, if weights C and B are equal in weight, as designed, then the friction is reduced in excess of 25% by dividing the actuating load, force or weight exerted on the flexible member of the gauge. A further means of reducing friction is the fact that the bottom sheave 9 is practically floating on its axle. This object is attained by making the weight of sheave 9 equal to double weight C. For example, the upward pull of cable 5 is equal to one-half of the weight of sheave 9. The relatively large diameter of the top sheaves is advantageous, in that a single sheave 3 of approximately fifteen inches in diameter, will be sufficient to support the cable 2 far enough away from the side wall of the tank to permit the float F to operate properly. By reducing the number of sheaves we cut down the cost of the gauge and facilitate the installation of the gauge.

In Figure 4, we have illustrated our improved gauge installed on a floating roof of the so-called pan type. The gauge is of practically the same construction as the gauge illustrated in Figure 1, with the exception that the supporting member 12$^a$ that carries the housing and guide member 7, is attached to a wind girder or reinforcing device 12$^b$ that projects laterally from the top edge of the side wall of the tank. The cable 2 from which the weight B is suspended is attached to a floating roof F' that rests upon or is sustained by the liquid in the tank, said floating roof being of such construction that the underside of same is in direct contact with the liquid. As the roof F' rises and falls, due to variations in the level of the liquid on which said roof floats, the tape A will move relatively to the reading box 11, and thus accurately indicate the depth or approximate quantity of the liquid in the tank D, as previously described.

Figure 5 illustrates our improved gauge installed on a tank provided with a floating roof F$^2$ of the combined breather and floater type, which is provided at its peripheral edge with pontoons F$^3$ that impart sufficient buoyancy to the roof to cause it to float on the liquid in the tank in such a way that there is a space between the level of the liquid and the underside of the roof in which gases can collect, the roof F$^2$ being formed from a limber sheet or flexible diaphragm that is capable of flexing upwardly and downwardly so as to vary the volume of the gas space on the underside of the roof. When our gauge is used on such a roof the cable 2 from which the weight B is suspended is attached to a float F sustained by the liquid in the tank and loosely mounted inside of a well or tubular guide member F$^4$ carried by one of the floats F$^3$. Due to the fact that said well or guide F$^4$ is arranged some distance inwardly from the side wall of the tank, it is necessary to mount an auxiliary sheave 3$^a$ on the top sheave housing 8, as shown in Figure 5, said auxiliary sheave 3$^a$ being preferably adjustably mounted in a bracket 3$^b$ on the top sheave housing 8.

Having thus described our invention, what we claim as new and desire to secure by Letters Patent is:

1. An automatic gauge for liquid storage tanks, comprising an element inside of the tank that rises and falls as the level of the liquid in the tank varies, a flexible member attached to said element and leading out of the tank, said flexible member having a graduated portion, a structure on the exterior of the tank on which said flexible member is arranged in a substantially loop form, a weight attached to an intermediate portion of the loop of said member, and an independent weight attached to the terminal end of said flexible member.

2. An automatic gauge for liquid storage tanks, comprising an element in the tank that rises and falls as the level of the liquid in the tank varies, a flexible member attached to said element and leading out of the tank, said flexible member having a graduated portion, a supporting structure on the exterior of the tank provided with sheaves on which said flexible member is arranged in a substantially loop form, an actuating weight attached to said flexible member intermediate the ends of said loop, and an additional weight attached to the terminal portion of said flexible member and having an opening or passageway that receives an intermediate portion of the loop formed by said flexible member.

3. An automatic gauge for liquid storage tanks comprising an element in the tank that is responsive to changes in the level of the liquid in the tank, a flexible member on the exterior of the tank attached to said element and provided with indicia that represent units of measurement, a guide on the exterior of the tank over which an intermediate portion of said flexible member passes, an independent guide over which the terminal portion of said flexible member passes. and independent weights attached to the terminal portion of said flexible member and to an intermediate looped portion of said member.

4. An automatic gauge for liquid storage tanks, comprising an element in the tank that rises and falls as the level of the liquid in the tank varies, a flexible member attached to said element and leading out of the tank, an overhead sheave over which said flexible member travels, a bottom sheave under which said flexible member travels, a second overhead sheave over which the terminal portion of said flexible member travels, a terminal weight attached to the free end of said flexible member, an intermediate weight attached to said flexible member between said bottom sheave and the sheave first referred to, there being indicia on said flexible member that represent units of measurement.

5. A gauge for liquid storage tanks, comprising an element in the tank that is responsive to changes in the level of the liquid in the tank, a flexible member attached to said element and leading out of the tank, said flexible member having graduations, a structure on the exterior of the tank provided with sheaves for said flexible member disposed so that said flexible member will comprise a substantially closed loop having a free end and a parallel strand that travels in the same direction as said free end, and a weight suspended from the free end of the looped portion of said flexible member, said structure comprising a tubular member in which said weight and the free end and the parallel strand of said flexible member are housed.

6. An automatic gauge for liquid storage tanks, comprising an element in the tank that rises and falls as the level of the liquid in the tank varies, a means on the exterior of the tank for indicating the level of the liquid, comprising a graduated flexible member and sheaves around which said flexible member travels, said sheaves being disposed so that said flexible member comprises a substantially closed loop having a free end and a parallel strand arranged adjacent to and traveling in the same direction as said free end, a terminal weight attached to the free end of said loop, a supporting and guiding structure for said flexible member and sheaves, a supporting member for said structure arranged adjacent the upper end of the tank, and a guy attached to the lower end of said structure and driven into the ground.

7. An automatic gauge for liquid storage tanks, comprising an element in the tank that rises and falls as the level of the liquid in the tank varies, a graduated flexible member attached to said element and leading out of the tank, a bottom sheave on the exterior of the tank arranged so that said flexible member will travel under the same and lead upwardly therefrom, an upper sheave over which said flexible member travels and from which the terminal end of said flexible member is suspended, and a weight attached to the terminal portion of said flexible member, and being so related to the weight of said bottom sheave that the tension in the flexible member will tend to lift said bottom sheave and cause said bottom sheave to substantially float on its axle.

8. An automatic gauge for liquid storage tanks, comprising an element that is responsive to changes in the level of the liquid in the tank, a graduated flexible member attached to said element and arranged to form a loop comprising a plurality of parallel sections or strands that travel in the same direction, a single member that houses both of said parallel strands or sections, and weights combined with the terminal portion and with an intermediate portion of the loop of said flexible member.

9. An automatic gauge for liquid storage tanks, comprising an element in the tank that is responsive to changes in the level of the liquid in the tank, a flexible member on the exterior of the tank for indicating the movement of said element, said flexible member having a graduated portion, a supporting and guiding structure for said flexible member, comprising a tubular member arranged on the exterior of the tank, said flexible member being arranged to form a loop that comprises two parallel strands, both of which are housed in and travel in the same direction through said tubular member, and a sheave housing mounted on said tubular members and provided with sheaves for the flexible member, said sheaves being located at opposite sides of the center axis of said tubular member.

10. An automatic gauge for liquid storage tanks, comprising an element in the tank that rises and falls as the level of the liquid in the tank varies, a graduated flexible member attached to said element and leading out of the tank, a supporting structure on the exterior of the tank provided with sheaves on which said flexible member is arranged to form a loop having a free end and an adjacent strand disposed parallel to said free end and traveling in the same direction as same, a terminal weight attached to the free end of said flexible member and provided with a passageway that receives the adjacent strand of said flexible member, and a member for housing said weight and also the free end and adjacent parallel strand of said flexible member.

JOHN H. WIGGINS.
CARROLL A. TURNER.